United States Patent
Omori et al.

(10) Patent No.: US 9,336,955 B2
(45) Date of Patent: *May 10, 2016

(54) NIOBIUM ALLOY, SINTERED BODY THEREOF, AND CAPACITOR USING THE SAME

(75) Inventors: Kazuhiro Omori, Kawasaki (JP); Kazumi Naito, Chiba (JP)

(73) Assignee: SHOWA DENKO K.K., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/630,308

(22) Filed: Dec. 3, 2009

(65) Prior Publication Data

US 2010/0086434 A1 Apr. 8, 2010

Related U.S. Application Data

(62) Division of application No. 10/495,211, filed as application No. PCT/JP02/12904 on Dec. 10, 2002, now Pat. No. 7,648,553.

(60) Provisional application No. 60/339,347, filed on Dec. 13, 2001.

(30) Foreign Application Priority Data

Dec. 10, 2001 (JP) ................................. 2001-375128

(51) Int. Cl.
- B22F 1/00 (2006.01)
- H01G 9/052 (2006.01)
- C22C 27/02 (2006.01)
- C22C 32/00 (2006.01)

(52) U.S. Cl.
CPC .............. H01G 9/0525 (2013.01); C22C 27/02 (2013.01); C22C 32/0068 (2013.01); *B22F 2998/10* (2013.01)

(58) Field of Classification Search
None
See application file for complete search history.

(56) References Cited

U.S. PATENT DOCUMENTS

| | | | | |
|---|---|---|---|---|
| 3,984,208 A * | 10/1976 | Moulin et al. | ................... | 75/245 |
| 4,084,965 A | 4/1978 | Fry | | |
| 4,812,951 A * | 3/1989 | Melody et al. | ................. | 361/504 |
| 5,242,481 A | 9/1993 | Kumar | | |
| 5,580,367 A * | 12/1996 | Fife | ................................. | 75/255 |
| 6,171,363 B1 | 1/2001 | Shekhter et al. | | |
| 6,215,652 B1 | 4/2001 | Yoshida et al. | | |
| 6,243,255 B1 | 6/2001 | Kuge et al. | | |
| 6,387,150 B1 | 5/2002 | Naito | | |
| 6,430,026 B1 * | 8/2002 | Nagato et al. | ................... | 361/305 |
| 6,556,427 B2 * | 4/2003 | Ohata et al. | .................... | 361/523 |
| 6,558,447 B1 * | 5/2003 | Shekhter et al. | ................ | 75/252 |
| 6,643,120 B2 * | 11/2003 | Omori et al. | ..................... | 361/508 |
| 6,652,619 B2 * | 11/2003 | Omori et al. | ..................... | 75/255 |
| 6,824,586 B2 * | 11/2004 | Omori et al. | ..................... | 75/255 |
| 6,909,594 B2 * | 6/2005 | Omori et al. | ..................... | 361/509 |
| 7,037,355 B2 * | 5/2006 | Naito et al. | ...................... | 75/245 |
| 7,132,006 B2 * | 11/2006 | Omori et al. | ..................... | 75/255 |
| 7,594,947 B2 * | 9/2009 | Omori et al. | ..................... | 75/255 |
| 7,648,553 B2 * | 1/2010 | Omori et al. | ..................... | 75/252 |
| 2001/0050838 A1 | 12/2001 | Naito et al. | | |
| 2002/0050185 A1 | 5/2002 | Oda et al. | | |
| 2003/0089197 A1 * | 5/2003 | Wada et al. | ...................... | 75/255 |
| 2003/0126944 A1 * | 7/2003 | Tripp et al. | ..................... | 75/244 |
| 2004/0168548 A1 * | 9/2004 | Wada et al. | ...................... | 75/354 |
| 2005/0109430 A1 | 5/2005 | Naito | | |

FOREIGN PATENT DOCUMENTS

| | | |
|---|---|---|
| EP | 1 093 137 | 4/2001 |
| JP | 55-157226 | 12/1980 |
| JP | 10-242004 | 9/1998 |
| JP | 2000-226602 | 8/2000 |
| JP | 2001-274040 A | 10/2001 |
| JP | 2001-307963 | 11/2001 |
| WO | 00/49633 | 8/2000 |
| WO | 00/67936 | 11/2000 |
| WO | 00/75943 A1 | 12/2000 |

* cited by examiner

*Primary Examiner* — George Wyszomierski
*Assistant Examiner* — Ngoclan T Mai
(74) *Attorney, Agent, or Firm* — Sughrue Mion, PLLC

(57) ABSTRACT

The present invention relates to a niobium alloy for capacitors comprising as an alloy component from 0.01 to 10 atom % of at least one element selected from the group consisting of the elements belonging to Groups 2 to 16 of the periodic table and further comprising diniobium mononitride crystals of from 0.1 to 70 mass %, wherein a powder of the niobium alloy has an average particle size of 0.05 to 5 μm and a BET specific surface area of 0.5 to 40 m²/g, a granulated product of the niobium alloy having an average particle size of 10 to 500 μm, a sintered body of the powder of the niobium alloy or granulated product thereof, a capacitor and a producing method thereof using the sintered body. A niobium capacitor using the powder of the niobium alloy of the present invention or a granulated product thereof has high capacitance and small leakage current value and is excellent in high-temperature property and heat resistance property.

5 Claims, No Drawings

NIOBIUM ALLOY, SINTERED BODY
THEREOF, AND CAPACITOR USING THE
SAME

CROSS REFERENCE TO THE RELATED APPLICATIONS

This is a divisional of application Ser. No. 10/495,211 filed May 12, 2004, which is a National Stage Application filed under §371 of PCT Application No. PCT/JP02/12904 filed Dec. 10, 2002 and which claims benefit of Provisional Application No. 60/339,347 filed Dec. 13, 2001, the above noted applications incorporated herein by reference in their entirety.

This is an application based on the prescription of 35 U.S.C. Section 111(a) with claiming the benefit of filing date of U.S. Provisional application Ser. No. 60/339,347 filed Dec. 13, 2001 under the provision of 35 U.S.C. 111(b), pursuant to 35 U.S.C. Section 119(e)(1).

TECHNICAL FIELD

The present invention relates to a capacitor, more specifically, to a niobium alloy for capacitors and a sintered body thereof, which can produce a capacitor having a large capacitance per unit mass, good high-temperature property and excellent heat resistance property, and also to a capacitor using the sintered body.

BACKGROUND ART

Capacitors for use in electronic instruments such as cellular phone and personal computer are demanded to have a small size and a large capacitance. Among these capacitors, a tantalum capacitor is preferred because of its large capacitance for the size and good performance. In this tantalum capacitor, a sintered body of tantalum powder is generally used for the anode moiety. In order to increase the capacitance of the tantalum capacitor, it is necessary to increase the mass of the sintered body or to use a sintered body increased in the surface area by pulverizing the tantalum powder.

The method of increasing the mass of the sintered body necessarily involves enlargement of the capacitor shape and cannot satisfy the requirement for downsizing. On the other hand, in the method of pulverizing tantalum powder to increase the specific surface area, the pore diameter of the tantalum sintered body decreases or closed pores increase at the stage of sintering, as a result, impregnation of the cathode agent at the later step becomes difficult. One of studies for solving these problems is to fabricate a capacitor using a sintered body of a material powder capable of giving a dielectric constant larger than that of tantalum. As such a material giving a larger dielectric constant, niobium and titanium are known.

JP-A-55-157226 (the term "JP-A" as used herein means an "unexamined published Japanese patent application") discloses a method for producing a sintered device for capacitors, where agglomerated powder or niobium fine powder having a particle size of 2.0 μm or less is molded under pressure and then sintered, the molded and sintered body is cut into fine pieces, a lead part is joined therewith and these are again sintered. However, the details on the properties of the capacitor are not described in this patent publication.

U.S. Pat. No. 4,084,965 discloses a capacitor using a sintered body of niobium powder of 5.1 μm obtained by hydrogenating and pulverizing a niobium ingot. However, the capacitor disclosed has a large leakage current (hereinafter sometimes simply referred to as "LC") value and is of little practical use.

U.S. Pat. No. 5,242,481 discloses a production method where the oxygen content in a niobium powder, a tantalum powder or a niobium and tantalum alloy powder is reduced to 300 ppm or less by using a reducing agent such as metal magnesium. However, this patent publication does not describe a capacitor using these powders.

U.S. Pat. No. 6,171,363 discloses a production method where a metal or an alloy of tantalum, niobium, titanium, molybdenum, tungsten, vanadium, zirconium or hafnium is produced from an oxide of tantalum, niobium, titanium, molybdenum, tungsten, vanadium, zirconium or hafnium by reducing the oxide using a reducing agent such as gaseous magnesium or calcium and where a niobium-tantalum alloy, a niobium-titanium alloy and a tantalum-titanium alloy are described as a capacitor material substituting tantalum. However, in Examples, only tantalum or niobium is used but a case of using a niobium alloy is not described and the performance of capacitor is not described either.

WO00/67936 discloses a production method where a metal or an alloy of tantalum, niobium, titanium, molybdenum, tungsten, vanadium, zirconium or hafnium is produced from an oxide of tantalum, niobium, titanium, molybdenum, tungsten, vanadium, zirconium or hafnium by reducing the oxide using a reducing agent such as gaseous magnesium or calcium. This patent publication discloses an example of niobium-tantalum alloy and states that when a niobium-tantalum alloy containing 15 atom % of tantalum is used, the thickness of the dielectric film per unit voltage becomes smaller than that when using niobium alone and thereby, the capacitance is increased. However, only tantalum or niobium is used in Examples and a case of using a niobium alloy is not described and the performance of capacitor is not described either.

JP-A-10-242004 discloses a technique of improving the LC value by, for example, nitriding a part of niobium powder. However, when producing capacitors having high capacitance from a niobium sintered body using the niobium powder having a small particle size, some capacitors exhibit a peculiarly large LC value.

JP-A-11-329902 (U.S. Pat. No. 6,215,652) discloses a niobium solid capacitor reduced in the change of electrostatic capacitance between before and after the reflow step at the mounting of parts. However, the capacitor disclosed has a capacitance as small as 2 μF and there are not disclosed high-temperature property with respect to the capacitance, which is described later, heat resistance and appearance frequency of defective/non-defective units with respect to LC.

These conventional niobium capacitors fail in fully satisfying all of capacitance, high-temperature property and heat resistance property and are not used in practice or even if used in practice, their use is very limited.

The ratio $(C-C_0)/C_0$ of the initial capacitance $C_0$ at room temperature to the capacitance C after a capacitor is left standing for 2,000 hours while applying a voltage in an atmosphere of 105° C. and then returned to room temperature is defined as the high-temperature property. When a sintered body is electrolytically oxidized and then combined with a counter electrode to produce a capacitor, the high-temperature property of tantalum capacitors using a tantalum sintered body usually falls within ±20%, however, the high-temperature property of some niobium capacitors using a conventional niobium sintered body does not fall within ±20%.

The heat resistance property is expressed, as a measure therefor, by the number of units showing a leakage current value (LC value) of 0.05 CV (a product of capacitance and rated voltage) or less when 50 capacitor units are manufactured and connected to a previously prepared substrate in a reflow furnace and then measured on the leakage current. The temperature at the exterior terminal part of a capacitor at the time of charging the substrate into the reflow furnace is kept at 230° C. for 30 seconds per charging and the number of operations of charging the substrate is 3. When a sintered body is electrolytically oxidized and then combined with a counter electrode to produce a capacitor, the number of capacitor units having a heat resistance property of 0.05 CV or more is usually 0/50 units in the case of capacitors produced from a sintered body using a tantalum powder, whereas sometimes capacitor units having a heat resistance property exceeding 0.05 CV appeared in the case of capacitors produced from a sintered body using a conventional niobium powder.

The niobium sintered body is inferior to a tantalum sintered body in the stability of oxide dielectric film. This difference outstandingly comes out at high temperatures. Many reasons are considered therefor but as one reason, it is presumed that due to difference between the composition of oxide dielectric film and the composition of niobium sintered body electrode, heat distortion occurs at high temperatures and thereby, the deterioration of oxide dielectric film is accelerated.

As such, capacitors using a niobium sintered body must be rated low in the reliability at room temperature and the service life thereof is sometimes judged defective. Therefore, their use in practice is limited.

DISCLOSURE OF THE INVENTION

Accordingly, the object of the present invention is to provide a niobium capacitor having high capacitance, small leakage current value, good high-temperature property and good heat resistance property. The object of the present invention includes providing a sintered body, a niobium alloy and a niobium composition for giving this niobium capacitor.

As a result of extensive investigations, the present inventors have found that the above-described objects can be attained by using a niobium alloy and a niobium alloy sintered body, comprising as an alloy component at least one element selected from the group consisting of the elements belonging to Groups 2 to 16 of the periodic table and further comprising diniobium mononitride crystal.

When at least one element selected from the group consisting of the elements belonging to Groups 2 to 16 of the periodic table is contained as an alloy component in niobium to alloy the niobium for improving the deterioration of oxide dielectric film due to heat distortion at high temperatures as described above, the heat distortion can be relieved to a certain extent but still it is not sufficient. By further incorporating a diniobium mononitride crystal into the niobium alloy containing as an alloy component at least one element selected from the group consisting of the elements belonging to Groups 2 to 16 of the periodic table, the heat distortion, for example, at the above-described high temperature is more relieved, and as a result, it is presumed that the capacitor using this niobium alloy powder or niobium alloy sintered body is greatly improved in both high-temperature property and heat resistance property.

Constituting a capacitor from this niobium alloy sintered body as one electrode, a counter electrode and a dielectric material interposed between these two electrodes enables to solve the above-described problems and to produce a capacitor having a large capacitance, good high-temperature property and heat resistance property.

More specifically, the present invention relates to a niobium alloy, a niobium composition powder, a sintered body thereof, a capacitor using the sintered body and a production method of the capacitor, which are described below.

1. A niobium alloy for capacitors comprising as an alloy component at least one element selected from the group consisting of the elements belonging to Groups 2 to 16 of the periodic table and further comprising a diniobium mononitride crystal.

2. A niobium alloy for capacitors as described in above, comprising as an alloy component at least one element selected from the group consisting of the elements belonging to Groups 3 to 16 of the periodic table and further comprising a diniobium mononitride crystal.

3. The niobium alloy for capacitors as described in 1 above, wherein the alloy component content is from 0.01 to 10 atom %.

4. The niobium alloy for capacitors as described in any one of 1 to 3 above, wherein the diniobium mononitride crystal content is from 0.1 to 70 mass %.

5. The niobium alloy for capacitors as described in any one of 1 to 4 above, which is a powder having an average particle size of 0.05 to 5 μm.

6. The niobium alloy for capacitors as described in any one of 1 to 5 above, which has a BET specific surface area of 0.5 to 40 m$^2$/g.

7. The niobium alloy for capacitors as described in any one of 1 to 6 above, which further comprises at least one element selected from the group consisting of boron, nitrogen, carbon and sulfur elements, in addition to the alloy component and the diniobium mononitride crystal.

8. A niobium composition powder for capacitors comprising at least one element selected from the group consisting of the elements belonging to Groups 2 to 16 of the periodic table or a compound thereof, which becomes an alloy component of a niobium alloy; niobium or a niobium compound; and a diniobium mononitride crystal.

9. The niobium composition powder for capacitors described in 8 above, wherein the alloy component of the niobium alloy is at least one element selected from the group consisting of the elements belonging to Groups 3 to 16 of the periodic table.

10. A niobium granulated product for capacitors obtained by granulating a powder of the niobium alloy described in any one of 1 to 7 above.

11. A niobium granulated product for capacitors obtained by granulating the niobium composition powder described in 8 or 9 above.

12. The niobium granulated product for capacitor as described in 10 or 11 above, wherein the average particle size is 10 to 500 μm.

13. A sintered body obtained by sintering the niobium alloy described in any one of 1 to 7 above.

14. A sintered body obtained by sintering the niobium composition powder described in 8 or 9 above.

15. A sintered body obtained by sintering the niobium granulated product described in any one of 10 to 12 above.

16. A capacitor comprising the sintered body described in any one of 13 to 15 above as one electrode, a dielectric material formed on the surface of the sintered body, and a counter electrode provided on the dielectric material.

17. A method for producing a capacitor, comprising sintering a niobium-containing powder to obtain a niobium alloy sintered body, disposing this sintered body as one part electrode, forming a dielectric material on the surface of the sintered body and providing a counter electrode on the dielectric material, wherein the method comprises a step of incorporating a diniobium mononitride crystal into the sintered body.

18. The method for producing a capacitor as described in 17 above, wherein the step of incorporating a diniobium mononitride crystal into the sintered body is performed by mixing a diniobium mononitride crystal and/or a hydride thereof with the niobium-containing powder.

19. The method for producing a capacitor as described in 17 above, wherein the step of incorporating a diniobium mononitride crystal into the sintered body is performed by nitriding the niobium-containing powder and producing a diniobium mononitride crystal from the nitrided niobium.

20. The method for producing a capacitor as described in 17 above, wherein the step of incorporating a diniobium mononitride crystal into the sintered body is performed by nitriding the niobium alloy sintered body and producing a diniobium mononitride crystal from the nitrided niobium.

21. The method for producing a capacitor as described in 19 or 20 above, wherein the production of diniobium mononitride crystal is performed by the exposure to $10^2$ to $10^6$ Pa and 800 to 1,500° C. for 1 minute to 100 hours in an inert gas atmosphere.

22. The method for producing a capacitor as described in any one of 17 to 19 above, wherein the niobium-containing powder is a niobium alloy powder and/or a hydride thereof.

23. The method for producing a capacitor as described in any one of 17 to 19 above, wherein the niobium-containing powder contains niobium and/or a hydride thereof and at least one element selected from the group consisting of the elements belonging to Groups 2 to 16 of the periodic table, which becomes an alloy component of the niobium alloy.

24. The method for producing a capacitor as described in 23 above, wherein the alloy component of the niobium alloy is at least one element selected from the group consisting of the elements belonging to Groups 3 to 16 of the periodic table.

25. An electronic circuit using the capacitor described in 16 above.

26. An electronic instrument using the capacitor described in 16 above.

MODE FOR CARRYING OUT THE INVENTION

One embodiment for obtaining the niobium alloy, the niobium composition powder, the sintered body thereof and the capacitor using the sintered body of the present invention is described below.

In the present invention, a niobium alloy comprising at least one element selected from the group consisting of the elements belonging to Groups 2 to 16 of the periodic table, which is an alloy component, and further comprising a diniobium mononitride crystal can be used as the material capable of satisfying the capacitor characteristics of both high-temperature property and heat resistance property. The "alloy" as used in the present invention includes a solid solution with the above alloy component(s). The content of the diniobium mononitride crystal is preferably from 0.1 to 70 mass. Also, a treatment for additionally incorporating at least one element selected from the group consisting of boron, nitrogen, carbon and sulfur elements, into the niobium alloy may be performed.

The total content of the at least one element selected from the group consisting of the elements belonging to Groups 2 to 16 of the periodic table, which is contained as an alloy component (excluding niobium) in the niobium alloy of the present invention, is suitably 10 atom % or less, preferably from 0.01 to 10 atom %, more preferably from 0.01 to 7 atom %, of the niobium alloy. If the total content of this element is less than 0.01 atom %, even if diniobium mononitride crystals are incorporated, the effect of restraining the electrolytic oxide film (dielectric film) formed by the electrolytic oxidation described later from undergoing heat distortion due to high temperatures cannot be easily obtained and it may fail to satisfy both the high-temperature property and the heat resistance property. On the other hand, if the total content of the elements exceeds 10 atom %, the content of niobium itself in the niobium alloy decreases and this incurs reduction in the capacitance as a capacitor. Therefore, in the material niobium alloy comprising as an alloy component at least one element selected from the group consisting of the elements belonging to Groups 2 to 16 of the periodic table, the total content of the alloy component elements is preferably from 0.01 to 10 atom %. Furthermore, for more reducing the leakage current, the content of these elements in the niobium alloy is more preferably 7 atom % or less, still more preferably from 0.1 to 7 atom %.

The average particle size of the niobium alloy powder of the present invention obtained by incorporating diniobium mononitride crystals into a niobium alloy comprising as an alloy component at least one element selected from the group consisting of the elements belonging to Groups 2 to 16 of the periodic table, is suitably 5 μm or less, preferably from 0.05 to 4 so as to enlarge the specific surface area of the powder material and thereby realize a high capacitance.

The average particle size ($D_{50}$: μm) and the specific surface area (S: $m^2/g$) of the niobium alloy powders (produced by the pulverization method) comprising zirconium and diniobium mononitride crystal, prepared as examples by the present inventors, are shown in Table 1.

TABLE 1

| Average Particle Size ($D_{50}$), (μm) | Specific Surface Area (S), ($m^2/g$) |
| --- | --- |
| 5 | 0.6 |
| 2 | 1.3 |
| 0.9 | 2.5 |
| 0.5 | 5.1 |
| 0.2 | 11.3 |
| 0.1 | 20.9 |
| 0.05 | 39.7 |

The average particle size ($D_{50}$: μm) shown in Table 1 is a value measured by using a particle size distribution measuring device ("Microtrac", trade name, manufactured by Microtrac) (the $D_{50}$ value represents a particle size when the cumulative mass % corresponds to 50 mass %). The specific surface area is a value measured by the BET method.

If the average particle size of the niobium alloy powder exceeds 5 μm, a large capacitor capacitance cannot be achieved, whereas if the average particle size is less than 0.05 μm, a sintered body produced from the powder has a small pore size and a large number of closed pores and this makes difficult the impregnation of a cathode agent, which is described later, and as a result, the capacitor can be hardly increased in the capacitance. Thus, this sintered body is not very suitable as a niobium alloy sintered body for capacitors.

From these reasons, the niobium alloy powder for use in the present invention preferably has an average particle size of 0.05 to 5 μm. With this average particle size, a large capacitor capacitance can be achieved.

The niobium alloy powder of the present invention is preferably a powder having a BET specific surface area of at least 0.5 $m^2/g$, more preferably at least 1 $m^2/g$, still more preferably at least 2 m²/g. Also, the niobium powder of the present invention is preferably a powder having a BET specific surface area of 0.5 to 40 m²/g, more preferably from 1 to 20 m²/g.

As described above, the zirconium-diniobium mononitride crystal-containing niobium alloy powder used for the production of a sintered body preferably has an average particle size of 0.5 to 4 μm.

In the following, the present invention is described by mainly referring to a niobium alloy comprising zirconium-diniobium mononitride crystal or a niobium alloy comprising neodymium-diniobium mononitride crystal, however, the present invention is not limited thereto. The contents in the following apply also to a niobium alloy comprising as an alloy component at least one element selected from the group consisting of the elements belonging to Groups 2 to 16 of the periodic table and further comprising a diniobium mononitride crystal.

The zirconium-diniobium mononitride crystal-containing niobium alloy powder having the above-described average particle size can be obtained by mixing a diniobium mononitride crystal and/or its hydride having an average particle size of 0.05 to 5 μm, for example, with a zirconium-containing niobium hydride alloy powder obtained by pulverizing a hydride of zirconium-niobium alloy ingot, pellet or powder or with a zirconium-containing niobium alloy powder obtained by dehydrogenating the above-described hydride alloy powder. In this mixing, the powders may be mixed with each other at room temperature or lower in an inert gas (e.g., Ar, He, nitrogen) atmosphere or may be mixed using an appropriate solvent such as water, methanol, dichloroethane or toluene. In the case of using an appropriate solvent, the solvent is preferably removed by distillation at a temperature of 50° C. or lower under reduced pressure. Using the resulting mixed powder, a sintered body may be prepared. Also, after the mixed powder is exposed to a temperature of 200 to 1,500° C. under a pressure of $10^{-3}$ to $10^6$ Pa (Pascal) for 1 minute to 100 hours in a reducing atmosphere (for example, in an atmosphere of Ar, He or $H_2$) and undergone processes such as cracking, if desired, a sintered body may be prepared.

As another production method of the zirconium-diniobium mononitride crystal-containing niobium alloy powder, for example, a zirconium-containing niobium hydride alloy powder having an average particle size of 0.5 to 5 μm, which is obtained by pulverizing a hydride of zirconium-niobium alloy ingot, pellet or powder, or a zirconium-containing niobium alloy powder obtained by dehydrogenating the hydride alloy powder is nitrided by exposing it to a temperature of 200 to 750° C., preferably from 300 to 600° C. under a pressure of $10^2$ to $10^6$ Pa for 1 minute to 100 hours in a nitrogen atmosphere and further exposing the powder to a temperature of 800 to 1,500° C., preferably from 850 to 1,100° C. under a pressure of $10^2$ to $10^6$ Pa for 1 minute to 100 hours in an inert gas atmosphere such as Ar or He so as to convert the nitrided niobium into a diniobium mononitride crystal, thereby producing a zirconium-diniobium mononitride crystal-containing niobium alloy powder. This method may be applied to a sintered body after sintering in place of the niobium alloy powder.

Furthermore, as another production method, a niobium powder or a niobium hydride powder, which is produced by pulverizing a hydride of niobium ingot or pellet, by dehydrogenating this niobium hydride powder, by pulverizing a sodium reduction product of potassium fluoroniobate or by pulverizing a reduction product of niobium oxide reduced using at least one member of hydrogen, carbon, magnesium, aluminum, cerium, lanthanum, misch metal and the like, is nitrided by exposing it to a temperature of 200 to 750° C., preferably from 300 to 600° C., under a pressure of $10^2$ to $10^6$ Pa for 1 minute to 100 hours in a nitrogen atmosphere, further exposing the powder to a temperature of 800 to 1,500° C., preferably from 850 to 1,100° C., under a pressure of $10^2$ to $10^6$ Pa for 1 minute to 100 hours in an inert gas atmosphere such as Ar or He so as to convert the nitrided niobium into a diniobium mononitride crystal. After undergoing the processes such as cracking, if desired, to obtain a diniobium mononitride crystal-containing niobium powder, the powder may be mixed with neodymium powder or a hydride, oxide, sulfide, boride, carbide, sulfate, halogenated salt, nitrate, organic acid salt or complex salt of neodymium.

The thus-obtained neodymium-diniobium mononitride crystal-containing niobium alloy powder may be mixed with a neodymium-containing niobium powder and/or niobium powder having an average particle size of 0.05 to 5 μm to adjust the content of diniobium mononitride crystal and/or the content of neodymium or may be further mixed with a diniobium mononitride crystal having an average particle size of 0.05 to 5 μm to adjust the content of diniobium mononitride crystal in the neodymium-diniobium mononitride crystal-containing niobium alloy powder.

As the neodymium-diniobium mononitride crystal-containing niobium alloy powder for capacitors of the present invention, the above-described neodymium-diniobium mononitride-containing niobium alloy powder may be granulated into an appropriate shape before use or the granulated powder may be mixed with an appropriate amount of non-granulated niobium powder and then used.

Granulated Product

Examples of the granulating methods include a method of allowing the non-granulated neodymium-diniobium mononitride crystal-containing niobium alloy powder to stand under highly reduced pressure, heating it at an appropriate temperature and then cracking the powder, a method of mixing an appropriate binder such as camphor, polyacrylic acid, polymethyl acrylic acid ester or polyvinyl alcohol, a solvent such as acetone, alcohols, acetic acid esters or water, and the non-granulated or granulated neodymium-diniobium mononitride crystal-containing niobium alloy powder and then cracking the mixture, a method of mixing an appropriate binder such as camphor, polyacrylic acid, polymethylacrylic acid ester or polyvinyl alcohol, a solvent such as acetone, alcohols, acetic acid esters or water, and the non-granulated or granulated neodymium-diniobium mononitride crystal-containing niobium alloy powder, sintering the mixture under highly reduced pressure, removing the added binder and solvent as gases by evaporation, sublimation or thermal decomposition and cracking the sintered neodymium-diniobium mononitride crystal-containing niobium alloy lump, and a method of mixing barium oxide, magnesium oxide or the like, a solvent such as acetone, alcohols, acetic acid esters or water, and the non-granulated or granulated neodymium-diniobium mononitride crystal-containing niobium powder, sintering the mixture under highly reduced pressure, cracking the sintered material, and removing the barium oxide, magnesium oxide or the like by dissolving it using an acid solution such as nitric acid or hydrochloric acid, or a solution containing a chelating agent.

The thus-granulated neodymium-diniobium mononitride crystal-containing niobium alloy powder is improved in the press-molding property at the production of a sintered body. In this case, the average particle size of the granulated powder is preferably from 10 to 500 μm. If the average particle size of the granulated powder is less than 10 μm, blocking partially takes place to worsen the flow property to a mold, whereas if it exceeds 500 μm, the compact after the press-molding is readily broken off. The average particle size of the granulated powder is more preferably from 30 to 250 μm, because a cathode agent is easily impregnated at the production of a capacitor after sintering the press-molded product. The neodymium-diniobium mononitride crystal-containing niobium alloy powder granulated as such has a repose angle of 60° or less and exhibits very smooth flow. The surface thereof is partially oxidized and the oxygen content is from 3,000 to 100,000 ppm. The amount of Fe, Cr, Ni, Ba, Mg, Si, Al, carbon and the like, which are impurities mingled from the apparatus or materials used, is hundreds of ppm or less.

The neodymium-diniobium mononitride crystal-containing niobium alloy sintered body for capacitors of the present invention is produced by sintering the above-described neodymium-diniobium mononitride crystal-containing niobium alloy powder or neodymium-diniobium mononitride crystal-containing niobium alloy granulated powder. The production method of the sintered body is not particularly limited, and the sintered body is obtained, for example, by press-molding the neodymium-diniobium mononitride crystal-containing niobium alloy powder into a predetermined shape and heating the obtained compact under $10^{-5}$ to $10^2$ Pa for a few minutes to tens of hours at 500 to 2,000° C., preferably from 900 to 1,500° C., more preferably from 900 to 1,300° C.

In order to further improve the leakage current value of the thus-obtained neodymium-diniobium mononitride crystal-containing niobium alloy powder, granulated powder or sintered body, a part of the neodymium-diniobium mononitride crystal-containing niobium alloy powder, granulated powder or sintered body may be subjected to nitridation, boronization, carbonization, sulfudization or a plurality of these treatments and may contain any of the obtained nitride, boride, carbide and sulfide of the neodymium-diniobium mononitride crystal-containing niobium alloy or may contain two or more thereof in combination.

Their total bonded amount, namely, the total content of nitrogen, boron, carbon and sulfur varies depending on the shape of the neodymium-diniobium mononitride crystal-containing niobium alloy powder, but is from more than 0 to 200,000 ppm, preferably from 50 to 100,000 ppm, more preferably from 200 to 20,000 ppm. If the total bonded amount exceeds 200,000 ppm, the capacitance property worsens and is not suitable as a capacitor.

The nitridation of the neodymium-diniobium mononitride crystal-containing niobium alloy powder, granulated powder or sintered body can be implemented by any one method of liquid nitridation, ion nitridation and gas nitridation or by a combination thereof. Among these, gas nitridation by a nitrogen gas atmosphere is preferred because the apparatus is simple and the operation is easy. For example, the gas nitridation by a nitrogen gas atmosphere can be achieved by allowing the neodymium-diniobium mononitride crystal-containing niobium alloy powder, granulated powder or sintered body to stand in a nitrogen atmosphere. With a nitridation atmosphere temperature of 2,000° C. or less and a standing time of 100 hours or less, a neodymium-diniobium mononitride crystal-containing niobium alloy powder, granulated powder or sintered body having an objective nitrided amount can be obtained. Also, by performing the treatment at a higher temperature, the treatment time can be shortened.

The boronization of the neodymium-diniobium mononitride crystal-containing niobium alloy powder, granulated powder or sintered body may be performed by either gas boronization or solid-phase boronization. For example, the neodymium-diniobium mononitride crystal-containing niobium alloy powder, granulated powder or sintered body may be boronized by allowing it to stand together with a boron source such as boron pellet or boron halide (e.g., trifluoroboron), at 2,000° C. or less for from 1 minute to 100 hours under reduced pressure.

The carbonization of the neodymium-diniobium mononitride crystal-containing niobium alloy powder, granulated powder or sintered body may be performed by any one of gas carbonization, solid-phase carbonization and liquid carbonization. For example, the neodymium-diniobium mononitride crystal-containing niobium alloy powder, granulated powder or sintered body may be carbonized by allowing it to stand together with a carbon source such as carbon material or organic material having carbon (e.g., methane), at 2,000° C. or less for from 1 minute to 100 hours under reduced pressure.

The sulfudization of the neodymium-diniobium mononitride crystal-containing niobium alloy powder, granulated powder or sintered body may be performed by any one of gas sulfudization, ion sulfudization and solid-phase sulfudization. For example, the gas sulfudization by a sulfur gas atmosphere can be attained by allowing the neodymium-diniobium mononitride crystal-containing niobium alloy powder, granulated powder or sintered body to stand in a sulfur atmosphere. With a sulfudization atmosphere temperature of 2,000° C. or less and a standing time of 100 hours or less, a niobium powder, granulated powder or sintered body having an objective sulfudized amount can be obtained. Also, by performing the treatment at a higher temperature, the treatment time can be shortened.

The production of a capacitor device is described below.

For example, a lead wire comprising a valve-acting metal such as niobium or tantalum and having appropriate shape and length is prepared and this lead wire is integrally molded at the press-molding of the niobium powder such that a part of the lead wire is inserted into the inside of the compact, whereby the lead wire can work out to an outgoing lead of the sintered body.

Using this sintered body as one electrode, a capacitor can be produced by interposing a dielectric material between the electrode and a counter electrode. The dielectric material used here for the capacitor is preferably a dielectric material mainly comprising niobium oxide. The dielectric material mainly comprising niobium oxide can be obtained, for example, by electrochemically forming the neodymium-diniobium mononitride crystal-containing niobium alloy sintered body as one electrode in an electrolytic solution. For electrochemically forming the neodymium-diniobium mononitride crystal-containing niobium alloy electrode in an electrolytic solution, an aqueous protonic acid solution is generally used, such as aqueous 0.1% phosphoric acid solution, aqueous sulfuric acid solution, aqueous 1% acetic acid solution or aqueous adipic acid solution. In the case of obtaining a niobium oxide dielectric material by electrochemically forming the neodymium-diniobium mononitride crystal-containing niobium alloy electrode in an electrolytic solution, the capacitor of the present invention is an electrolytic capacitor and the neodymium-diniobium mononitride crystal-containing niobium alloy electrode serves as an anode.

In the capacitor of the present invention, the counter electrode to the niobium sintered body is not particularly limited and for example, at least one material (compound) selected from electrolytic solutions, organic semiconductors and inorganic semiconductors known in the art of aluminum electrolytic capacitor, may be used. Specific examples of the electrolytic solutions include a dimethylformamide-ethylene glycol mixed solution having dissolved therein 5 mass % of an isobutyltripropylammonium borotetrafluoride electrolyte, and a propylene carbonate-ethylene glycol mixed solution having dissolved therein 7 mass % of tetraethylammonium borotetrafluoride. Specific examples of the organic semiconductors include an organic semiconductor comprising benzopyrroline tetramer and chloranile, an organic semiconductor mainly comprising tetrathiotetracene, an organic semiconductor mainly comprising tetracyanoquinodimethane, and an electrically conductive polymer containing a repeating unit represented by the following formula (1) or (2):

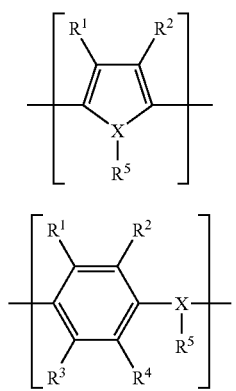

wherein $R^1$ to $R^4$ each independently represents a monovalent group selected from the group consisting of a hydrogen atom, a linear or branched, saturated or unsaturated alkyl, alkoxy or alkylester group having from 1 to 10 carbon atoms, a halogen atom, a nitro group, a cyano group, a primary, secondary or tertiary amino group, a $CF_3$ group, a phenyl group and a substituted phenyl group; hydrocarbon chains of the pair of $R^1$ and $R^2$ or $R^3$ and $R^4$ may combine at an arbitrary position to form a divalent chain for forming at least one 3-, 4-, 5-, 6- or 7-membered saturated or unsaturated hydrocarbon cyclic structure together with the carbon atoms substituted by $R^1$ and $R^2$ or by $R^3$ and $R^4$; the cyclic combined chain may contain a bond of carbonyl, ether, ester, amide, sulfide, sulfinyl, sulfonyl or imino at an arbitrary position; X represents an oxygen atom, a sulfur atom or a nitrogen atom; $R^5$ is present only when X is a nitrogen atom, and independently represents a hydrogen atom or a linear or branched, saturated or unsaturated alkyl group having from 1 to 10 carbon atoms.

In the present invention, $R^1$ to $R^4$ in formula (1) or (2) each independently preferably represents a hydrogen atom or a linear or branched, saturated or unsaturated alkyl or alkoxy group having from 1 to 6 carbon atoms, and each of the pair of $R^1$ and $R^2$ and pair of $R^3$ and $R^4$ may combine with each other to form a ring.

In the present invention, the electrically conductive polymer containing a repeating unit represented by formula (1) is preferably an electrically conductive polymer containing a structure unit represented by the following formula (3) as a repeating unit:

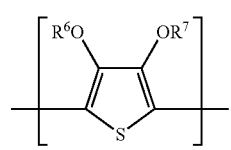

wherein $R^6$ and $R^7$ each independently represents a hydrogen atom, a linear or branched, saturated or unsaturated alkyl group having from 1 to 6 carbon atoms, or a substituent for forming at least one 5-, 6- or 7-membered saturated hydrocarbon cyclic structure containing two oxygen elements when the alkyl groups are combined with each other at an arbitrary position; and the cyclic structure includes a structure having a vinylene bond which may be substituted, and a phenylene structure which may be substituted.

The electrically conductive polymer containing such a chemical structure bears an electric charge and is doped with a dopant. For the dopant, known dopants can be used without limitation.

Specific examples of the inorganic semiconductors include an inorganic semiconductor mainly comprising lead dioxide or manganese dioxide, and an inorganic semiconductor comprising tri-iron tetroxide. These semiconductors may be used individually or in combination of two or more thereof.

Examples of the polymer containing a repeating unit represented by formula (1) or (2) include polyaniline, polyoxyphenylene, polyphenylene sulfide, polythiophene, polyfuran, polypyrrole, polymethylpyrrole, and substitution derivatives and copolymers thereof. Among these, preferred are polypyrrole, polythiophene and substitution derivatives thereof (e.g., poly(3,4-ethylenedioxythiophene)).

When the organic or inorganic semiconductor used has an electrical conductivity of $10^{-2}$ to $10^3$ S/cm, the capacitor produced can have a smaller impedance value and can be more increased in the capacitance at a high frequency.

The electrically conductive polymer layer is produced, for example, by a method of polymerizing a polymerizable compound such as aniline, thiophene, furan, pyrrole, methylpyrrole or a substitution derivative thereof under the action of an oxidizing agent capable of satisfactorily performing an oxidation reaction of dehydrogenative two-electron oxidation. Examples of the polymerization reaction from the polymerizable compound (monomer) include vapor phase polymerization and solution polymerization. The electrically conductive polymer layer is formed on the surface of the niobium sintered body having thereon a dielectric material. In the case where the electrically conductive polymer is an organic solvent-soluble polymer capable of coating in the form of solution, a method of coating the polymer on the surface of the sintered body to form an electrically conductive polymer layer is used.

One preferred example of the production method using the solution polymerization is a method of dipping the niobium sintered body having formed thereon a dielectric layer in a solution containing an oxidizing agent (Solution 1) and subsequently dipping the sintered body in a solution containing a monomer and a dopant (Solution 2), thereby performing the polymerization to form an electrically conductive polymer layer on the surface of the sintered body. Also, the sintered body may be dipped in Solution 1 after it is dipped in Solution 2. Solution 2 used in the above-described method may be a monomer solution not containing a dopant. In the case of using a dopant, the dopant may be allowed to be present together with an oxidizing agent in the solution.

The operation of these polymerization steps is performed once or more, preferably repeated from 3 to 20 times, per the niobium sintered body having thereon a dielectric material, whereby a dense and stratified electrically conductive polymer layer can be easily formed.

In the production method of a capacitor of the present invention, any oxidizing agent may be used insofar as it does not adversely affect the capacitor performance and the reductant of the oxidizing agent can work out to a dopant and elevate the conductivity of the electrically conductive polymer. An industrially inexpensive compound easy to handle at the production is preferred.

Specific examples of the oxidizing agents include Fe(III)-base compounds such as $FeCl_3$, $FeClO_4$ and Fe (organic acid anion) salt; anhydrous aluminum chloride/cuprous chloride; alkali metal persulfates; ammonium persulfates; peroxides; manganeses such as potassium permanganate; quinones such as 2,3-dichloro-5,6-dicyano-1,4-benzoquinone (DDQ), tetrachloro-1,4-benzoquinone and tetracyano-1,4-benzoquinone; halogens such as iodine and bromine; peracid; sulfonic acids such as sulfuric acid, fuming sulfuric acid, sulfur trioxide, chlorosulfuric acid, fluorosulfuric acid and amidosulfuric acid; ozone; and a mixture of a plurality of these oxidizing agents.

Examples of the fundamental compounds of the organic acid anion forming the above-described Fe (organic acid anion) salt include organic sulfonic acid, organic carboxylic acid, organic phosphoric acid and organic boric acid. Specific examples of the organic sulfonic acid include benzenesulfonic acid, p-toluenesulfonic acid, methanesulfonic acid, ethanesulfonic acid, α-sulfonaphthalene, β-sulfonaphthalene, naphthalenedisulfonic acid and alkylnaphthalenesulfonic acid (examples of the alkyl group include butyl, triisopropyl and di-tert-butyl).

Specific examples of the organic carboxylic acid include acetic acid, propionic acid, benzoic acid and oxalic acid. Furthermore, polymer electrolyte anions such as polyacrylic acid, polymethacrylic acid, polystyrenesulfonic acid, polyvinylsulfonic acid, poly-α-methylsulfonic acid polyvinylsulfate, polyethylenesulfonic acid and polyphosphoric acid may also be used in the present invention. These organic sulfuric acids and organic carboxylic acids are mere examples and the present invention is not limited thereto. Examples of the counter cation to the above-described anion include $H^+$, alkali metal ions such as $Na^+$ and $K^+$, and ammonium ions substituted by a hydrogen atom, a tetramethyl group, a tetraethyl group, a tetrabutyl group or a tetraphenyl group, however, the present invention is not limited thereto. Among these oxidizing agents, preferred are oxidizing agents containing trivalent Fe-base compounds, cuprous chloride, alkali persulfates, ammonium persulfates or quinones.

For the anion having a dopant ability which is allowed to be present, if desired, in the production of a polymer composition for the electrically conductive polymer (anion other than the reductant anion of the oxidizing agent), an electrolyte anion having as a counter ion an oxidizing agent anion (a reductant of oxidizing agent) produced from the above-described oxidizing agent, or other electrolyte anion may be used. Specific examples thereof include protonic acid anions including halide anion of Group 5B elements such as $PF_6^-$, $SbF_6^-$ and $AsF_6^-$; halide anion of Group 3B elements such as $BF_5^-$; halogen anion such as $I^-$ ($I_3^-$), $Br^-$ and $Cl^-$; perhalogenate anion such as $ClO_4^-$; Lewis acid anion such as $AlCl_4^-$, $FeCl_4^-$ and $SnCl_5^-$; inorganic acid anion such as $NO_3^-$ and $SO_4^{2-}$; sulfonate anion such as p-toluenesulfonic acid, naphthalenesulfonic acid and alkyl-substituted naphthalenesulfonic acid having from 1 to 5 carbon atoms (simply referred to as "C1-5"); organic sulfonate anion such as $CF_3SO_3^-$ and $CH_3SO_3^-$; and carboxylate anion such as $CH_3COO^-$ and $C_6H_5COO^-$.

Other examples include polymer electrolyte anions such as polyacrylic acid, polymethacrylic acid, polystyrenesulfonic acid, polyvinylsulfonic acid, polyvinylsulfuric acid, poly-α-methylsulfonic acid, polyethylenesulfonic acid and polyphosphoric acid. The present invention is not limited thereto. However, among these anions, preferred is a high molecular or low molecular organic sulfonic acid compound or polyphosphoric acid compound. Preferably, an aromatic sulfonic acid compound (sodium dodecylbenzenesulfonate, sodium naphthalenesulfonate, etc.) is used as the anion-donating compound.

Among the organic sulfonate anions, more effective dopants are anions of a sulfoquinone compound having one or more sulfo-anion group ($—SO_3^-$) within the molecule and having a quinone structure and of an anthracene sulfonate.

Examples of the fundamental skeletons for the sulfoquinone anion of the above-described sulfoquinone compound include p-benzoquinone, o-benzoquinone, 1,2-naphthoquinone, 1,4-naphthoquinone, 2,6-naphthoquinone, 9,10-anthraquinone, 1,4-anthraquinone, 1,2-anthraquinone, 1,4-chrysenquinone, 5,6-chrysenquinone, 6,12-chrysenquinone, acenaphthoquinone, acenaphthenequinone, camphorquinone, 2,3-bornanedione, 9,10-phenanthrenequinone and 2,7-pyrenequinone.

In the case where the counter electrode is solid, an electrically conductive layer may be provided thereon, if desired, so as to attain good electrical contact with an exterior outgoing lead (for example, lead frame) to be used.

The electrically conductive layer can be formed, for example, by solidification of an electrically conductive paste, plating, metallization or forming a heat-resistant electrically conductive resin film. Preferred examples of the electrically conductive paste include silver paste, copper paste, aluminum paste, carbon paste and nickel paste, and these may be used individually or in combination of two or more thereof. In the case of using two or more kinds of pastes, the pastes may be mixed or may be superposed one on another as separate layers. The electrically conductive paste applied is then solidified by allowing it to stand in air or under heating. Examples of the plating include nickel plating, copper plating, silver plating and aluminum plating. Examples of the vapor-deposited metals include aluminum, nickel, copper and silver.

More specifically, for example, carbon paste and silver paste are stacked in this order on the second electrode and these are sealed with a material such as epoxy resin, thereby fabricating a capacitor. This capacitor may have a lead formed of niobium, niobium alloy, diniobium mononitride crystal-containing niobium, diniobium mononitride crystal-containing niobium alloy or tantalum, which is sintered and molded integrally with the neodymium-diniobium mononitride crystal-containing niobium sintered body or is welded afterward.

The thus-fabricated capacitor of the present invention is jacketed using, for example, resin mold, resin case, metallic jacket case, dipping of resin or laminate film, and then used as a capacitor product for various uses.

In the case where the counter electrode is liquid, the capacitor fabricated from the above-described two electrodes and a dielectric material is housed, for example, in a can electrically connected to the counter electrode to complete the capacitor. In this case, the electrode side of the neodymium-diniobium mononitride crystal-containing niobium sintered body is guided outside through the above-described lead formed of niobium, niobium alloy, diniobium mononitride crystal-containing niobium, diniobium mononitride crystal-containing niobium alloy or tantalum, and at the same time, insulated from the can using an insulating rubber or the like.

By producing a sintered body for capacitors using the niobium alloy powder produced according to the embodiment of the present invention described in the foregoing pages and producing a capacitor from the sintered body, a capacitor having a small leakage current value, satisfied in both the high-temperature property and heat resistance property and ensuring good reliability can be obtained.

The capacitor of the present invention has a larger electrostatic capacitance for the volume than that of conventional tantalum capacitors and therefore, a smaller capacitor product can be obtained.

The capacitor of the present invention having such properties can be applied to uses, for example, as a by-pass or coupling capacitor in an analogue or digital circuit or as a large-capacitance smoothing capacitor used in a power circuit, and also to uses of conventional tantalum capacitors.

Generally, such a capacitor is often used in an electronic circuit and when the capacitor of the present invention is used, the limitation in the arrangement of electronic parts or by the discharge of heat can be relieved, and as a result, an electronic circuit having high reliability can be disposed in a smaller space than that necessary for a conventional electronic circuit. Furthermore, when the capacitor of the present invention is used, an electronic instrument having smaller size and higher reliability than those of conventional ones can be obtained, such as computers, computer peripheral equipment (e.g., PC card), mobile equipment (e.g., portable telephone), home appliance, equipment mounted on vehicles, artificial satellites and communication equipment.

EXAMPLES

The present invention is described in greater detail below by referring to Examples and Comparative Examples, however, the present invention is not limited to these Examples.

In each Example, the physical properties were measured and evaluated by the following methods.

(1) Content of Diniobium Mononitride Crystal in Diniobium Mononitride Crystal-Containing Niobium Alloy Powder A diniobium mononitride crystal and a niobium alloy powder after mixing thereto the crystal having a known mass were subjected to X-ray diffractometry and a calibration curve was prepared from the 2θ diffraction intensity at the measurement and the mass mixed. From the calibration curve, the content was calculated.

(2) Content of Alloy Components Except for Niobium in Diniobium Mononitride Crystal-Containing Niobium Alloy Powder The content was determined by atomic absorptometry, ICP emission analysis or ICP mass spectrometry.

(3) Measurement of Capacitance of Capacitor

An LCR meter (Precision LCR Meter HP 4284A Model) manufactured by Hewlett-Packard was connected between terminals of a produced chip at room temperature and the capacitance at 120 Hz was determined as the capacitance of the capacitor processed into a chip.

(4) Measurement of Leakage Current of Capacitor

Out of rated voltage values (2.5 V, 4 V, 6.3 V, 10 V, 16 V, 25 V, etc.), a d.c. voltage (6.3 V) nearly about ⅓ to about ¼ of the chemical forming voltage (d.c., 20 V) at the manufacture of a dielectric material was continuously applied between terminals of a produced chip for 1 minute at room temperature and thereafter, the current value was measured and determined as the leakage current value of the capacitor processed into a chip.

(5) High-Temperature Property of Capacitor

The ratio $(C-C_0)/C_0$ of the initial capacitance $C_0$ at room temperature to the capacitance C after a capacitor is left standing in an atmosphere of 105° C. for 2,000 hours while applying a voltage of 4 V and then returned to room temperature is defined as the high-temperature property. The sample of the ratio within ±20% was rated non-defective. The high-temperature property was evaluated by the ratio of the number of samples and the number of non-defective samples. In each Example, the number of samples was 50 units.

(6) Heat Resistance of Capacitor

A capacitor was mounted with a solder on a 1.5 mm-thick lamination substrate and passed through a reflow furnace at 230° C. over 30 seconds. This operation was repeated three times. Usually, a capacitor was heated at about 230° C.×30 seconds×3 times at the passing through a reflow furnace and evaluated on the practical heat history (heat history by soldering three times, for example, when carrying out the soldering of parts mounted on the substrate surface, the soldering of parts mounted on the back surface of a substrate, or the soldering of after-mounted parts).

The LC value was measured at a rated voltage of 6.3 V before passing through the reflow furnace and after passing three times. Samples showing an LC value of 0.05 CVµA or less was rated non-defective and the heat resistance was evaluated by the ratio of the number of samples and the number of non-defective samples. In each Example, the number of samples was 50 units.

Preparation Method 1 of Sintered Body:

Using 198 g of niobium ingot and 2 g of zirconium powder, a zirconium-containing niobium ingot (alloy) containing 1 atom % of zirconium was manufactured by arc melting. In an SUS 304-made reactor, 150 g of this ingot was placed and thereinto, hydrogen was continuously introduced at 400° C. for 10 hours. After cooling, the hydrogenated zirconium-containing niobium lump was placed in an SUS 304-made pot containing SUS-made balls and pulverized for 10 hours. The obtained hydride was formed into a slurry of 20 vol % with water, charged together with zirconia balls in an SUS 304-made spike mill and wet pulverized for 7 hours. The resulting slurry was centrifuged and then decanted to obtain a pulverized product. The pulverized product was dried under reduced pressure in the conditions of $1.33 \times 10^2$ Pa and 50° C. Subsequently, the zirconium hydride-containing niobium powder was dehydrogenated by heating it at $1.33 \times 10^{-2}$ Pa and 400° C. for 1 hour. The manufactured zirconium-containing niobium powder had an average particle size of 1 µm and a zirconium content of 1 atom % (1 mass %).

In an SUS 304-made pot, 100 g of this zirconium-containing niobium powder and 100 g of diniobium mononitride crystal having an average particle size of 0.8 ml were charged together with zirconia-made balls. Thereto, 200 g of ion exchanged water was added and these were mixed by rotating at a speed of 40 revolutions per minute for 3 hours. The obtained slurry was dried under reduced pressure in the conditions of $1.33 \times 10^2$ Pa and 50° C. The resulting mixed powder of zirconium-containing niobium powder and diniobium mononitride crystal was charged in a niobium-made vat and placed in a sintering furnace. After purging the inside of the sintering body system with argon, the powder was granulated under reduced pressure of $6 \times 10^{-3}$ Pa at 1,100° C. Thereafter, the granulated lump was cracked to obtain a granulated powder having an average particle size of 110 µm. This granulated powder had a zirconium content of 0.5 mass % and a diniobium mononitride crystal content of 50 mass %.

The thus-obtained zirconium-diniobium mononitride crystal-containing niobium granulated powder was molded together with a 0.3 mmφ niobium wire to manufacture a compact (about 0.1 g) having a size of approximately 0.3 cm×0.18 cm×0.45 cm.

This compact was left standing under reduced pressure of $4 \times 10^{-3}$ Pa at 1,200° C. for 30 minutes to obtain a sintered body.

Preparation Method 2 of Sintered Body:

9,200 g of niobium pellet and 92 g of zirconium pellet were thoroughly mixed and a zirconium-containing niobium ingot (alloy) containing 1 atom % of zirconium was manufactured by the electron beam melting method. In an SUS 304-made reactor, 5,000 g of this ingot was placed and thereinto, hydrogen was continuously introduced at 400° C. for 10 hours. After cooling, the hydrogenated zirconium-containing niobium lump was placed in an SUS 304-made pot containing SUS-made balls and pulverized for 10 hours. The obtained hydride was formed into a slurry of 20 vol % with water, charged together with zirconia balls in an SUS 304-made spike mill and wet pulverized for 10 hours. The resulting slurry was centrifuged and then decanted to obtain a pulverized product. The pulverized product was dried under reduced pressure in the conditions of $1.33 \times 10^2$ Pa and 50° C. The resulting zirconium hydride-containing niobium powder was dehydrogenated by heating it at $1.33 \times 10^{-2}$ Pa and 400° C. for 1 hour. The manufactured zirconium-containing niobium powder had an average particle size of 0.9 μm and a zirconium content of 1 atom % (1 mass %). Subsequently, the zirconium-containing niobium powder was charged in a niobium-made vat and placed in a sintering furnace. After purging the inside of the sintering body system with argon, the powder was granulated under reduced pressure of $6 \times 10^{-3}$ Pa at 1,100° C. Thereafter, the granulated lump was cracked to obtain a granulated powder having an average particle size of 90 μm. This granulated powder had a zirconium content of 1 mass %.

This zirconium-containing niobium granulated powder was charged into a molybdenum-made reactor and after thoroughly purging the inside of the reactor with nitrogen, nitrided by continuously heating it at 580° C. for 5 hours while passing nitrogen. The system was cooled to room temperature, the inside of the reactor was thoroughly purged with Ar and the powder was heated at 950° C. for 8 hours to convert the nitrided niobium into diniobium mononitride crystal. After cooling to room temperature, a zirconium-diniobium mononitride crystal-containing niobium granulated powder was obtained.

In this zirconium-diniobium mononitride crystal-containing niobium granulated powder, the zirconium content was 0.9 mass % and the diniobium mononitride crystal content was 55 mass %.

The thus-obtained zirconium-diniobium mononitride crystal-containing niobium granulated powder was molded together with a 0.3 mmφ niobium wire to manufacture a compact (about 0.1 g) having a size of approximately 0.3 cm×0.18 cm×0.45 cm.

This compact was left standing under reduced pressure of $4 \times 10^{-3}$ Pa at 1,200° C. for 30 minutes to obtain a sintered body.

Preparation Method 3 of Sintered Body:

Into a nickel crucible containing 2,000 g of potassium fluoroniobate thoroughly dried under reduced pressure at 80° C., sodium was charged in an amount of 10 molar times the potassium fluoroniobate and a reduction reaction was performed at 1,000° C. for 20 hours in an argon atmosphere. After the completion of reaction, the system was cooled and the reduction product was washed with water, then washed sequentially with 95% sulfuric acid and with water, and dried under reduced pressure. Thereafter, the product was pulverized for 10 hours using a ball mill of an alumina pot containing silica alumina balls and the pulverized product was dipped and stirred in a 3:2 (by mass) mixed solution of 50% nitric acid and 10% aqueous hydrogen peroxide, then thoroughly washed with water until the pH reached 7, thereby removing impurities, and dried under reduced pressure. The manufactured niobium powder had an average particle size of 0.9 μm.

Thereafter, 500 g of this niobium powder was charged into a molybdenum-made reactor and after thoroughly purging the inside of the reactor with nitrogen, nitrided by continuously heating it at 500° C. for 10 hours while passing nitrogen. The system was cooled to room temperature, the inside of the reactor was thoroughly purged with Ar and the powder was heated at 800° C. for 20 hours to convert the nitrided niobium into diniobium mononitride crystal. After cooling to room temperature, a diniobium mononitride crystal-containing niobium powder was obtained.

In an SUS 304-made pot, 500 g of this diniobium mononitride crystal-containing niobium powder and 10 g of zirconium hydride having an average particle size of 0.9 μm were charged together with zirconia-made balls. Thereto, 200 g of ion exchanged water was added and these were mixed by rotating at a speed of 20 revolutions per minute for 5 hours. The obtained slurry was dried under reduced pressure in the conditions of $1.33 \times 10^2$ Pa and 50° C. The resulting mixed powder of zirconium hydride and diniobium mononitride crystal-containing niobium powder was charged in a niobium-made vat and placed in a sintering furnace. After purging the inside of the sintering body system with argon, the powder was granulated under reduced pressure of $6 \times 10^{-3}$ Pa at 1,150° C. Thereafter, the granulated lump was cracked to obtain a granulated powder having an average particle size of 150 μm.

In this zirconium-diniobium mononitride crystal-containing niobium granulated powder, the zirconium content was 1.8 mass % and the diniobium mononitride crystal content was 25 mass %.

The thus-obtained zirconium-diniobium mononitride crystal-containing niobium granulated powder was molded together with a 0.3 mmφ niobium wire to manufacture a compact (about 0.1 g) having a size of approximately 0.3 cm×0.18 cm×0.45 cm.

This compact was left standing under reduced pressure of $4 \times 10^{-3}$ Pa at 1,200° C. for 30 minutes to obtain a sintered body.

Preparation Method 4 of Sintered Body:

In an SUS 304-made reactor, 500 g of a niobium ingot was placed and thereinto, hydrogen was continuously introduced at 400° C. for 10 hours. After cooling, the hydrogenated niobium lump was placed in an SUS 304-made pot containing SUS-made balls and pulverized for 10 hours. The obtained hydride was formed into a slurry of 20 vol with water, charged together with zirconia balls in an SUS 304-made spike mill and wet pulverized for 7 hours. The resulting slurry was centrifuged and then decanted to obtain a pulverized product. The pulverized product was dried under reduced pressure in the conditions of $1.33 \times 10^2$ Pa and 50° C.

Subsequently, the resulting niobium hydride powder was dehydrogenated by heating it at $1.33 \times 10^{-2}$ Pa and 400° C. for 1 hour. The manufactured niobium powder had an average particle size of 1 μm. This niobium powder was granulated at 1,100° C. under reduced pressure of $4 \times 10^{-3}$ Pa. Thereafter, the granulated lump was cracked to obtain a granulated powder having an average particle size of 100 μm.

The thus-obtained niobium granulated powder was molded together with a 0.3 mmφ niobium wire to manufacture a compact (about 0.1 g) having a size of approximately 0.3 cm×0.18 cm×0.45 cm.

This compact was left standing under reduced pressure of $4 \times 10^{-3}$ Pa at 1,200° C. for 30 minutes to obtain a sintered body.

Preparation Method 5 of Sintered Body:

Into a nickel crucible containing 2,000 g of potassium fluoroniobate thoroughly dried under reduced pressure at 80° C., sodium was charged in an amount of 10 molar times the potassium fluoroniobate and a reduction reaction was performed at 1,000° C. for 20 hours in an argon atmosphere. After the completion of reaction, the system was cooled and the reduction product was washed with water, then washed sequentially with 95% sulfuric acid and with water, and dried under reduced pressure. Thereafter, the product was pulverized for 10 hours using a ball mill of an alumina pot containing silica alumina balls and the pulverized product was dipped and stirred in a 3:2 (by mass) mixed solution of 50% nitric acid and 10% aqueous hydrogen peroxide, then thoroughly washed with water until the pH reached 7, thereby removing impurities, and dried under reduced pressure. The manufactured niobium powder had an average particle size of 0.9 μm. This niobium powder was granulated at 1,100° C. under reduced pressure of $4\times10^{-3}$ Pa. The obtained granulated powder was cracked to obtain a granulated powder having an average particle size of 100 μm.

The thus-obtained niobium granulated powder was molded together with a 0.3 mmφ niobium wire to manufacture a compact (about 0.1 g) having a size of approximately 0.3 cm×0.18 cm×0.45 cm.

This compact was left standing under reduced pressure of $4\times10^{-3}$ Pa at 1,200° C. for 30 minutes to obtain a sintered body.

Preparation Method 1 of Capacitor:

Units of a sintered body obtained in the same manner as in Preparation Method 2 of Sintered Body were prepared. Each sintered body was electrolytically oxidized at a voltage of 20 V for 6 hours using an aqueous 0.1% phosphoric acid solution to form an oxide dielectric film on the surface. Thereafter, an operation of dipping the sintered body in an aqueous 60% manganese nitrate solution and drying it at 220° C. for 30 minutes was repeated to form a manganese dioxide layer as a counter electrode layer on the oxide dielectric film. Subsequently, a carbon layer and a silver paste layer were sequentially stacked thereon. A lead frame was placed on the obtained laminate and the entire was sealed with epoxy resin to manufacture a chip-type capacitor.

Preparation Method 2 of Capacitor:

Units of a sintered body obtained in the same manner as in Preparation Method 2 of Sintered Body were prepared. Each sintered body was electrolytically oxidized at a voltage of 20 V for 6 hours using an aqueous 0.1% phosphoric acid solution to form an oxide dielectric film on the surface. Thereafter, an operation of dipping the sintered body in a 1:1 (by volume) mixed solution of an aqueous 35% lead acetate solution and an aqueous 35% ammonium persulfate solution and reacting these at 40° C. for 1 hour was repeated to form a mixed layer of lead dioxide and lead sulfate as a counter electrode layer on the oxide dielectric film. Subsequently, a carbon layer and a silver paste layer were sequentially stacked thereon. A lead frame was placed on the obtained laminate and the entire was sealed with epoxy resin to manufacture a chip-type capacitor.

Preparation Method 3 of Capacitor:

50 Units of a sintered body obtained in the same manner as in Preparation Method 2 of Sintered Body were prepared. Each sintered body was electrolytically oxidized at a voltage of 20 V for 6 hours using an aqueous 0.1% phosphoric acid solution to form an oxide dielectric film on the surface. Thereafter, an operation of contacting the oxide dielectric film with an equivalent mixed solution of an aqueous 10% ammonium persulfate solution and an aqueous 0.5% anthraquinone sulfonic acid solution and then with a pyrrole vapor was repeated at least 5 times to form a counter electrode composed of polypyrrole.

Subsequently, a carbon layer and a silver paste layer were sequentially stacked thereon. A lead frame was placed on the obtained laminate and the entire was sealed with epoxy resin to manufacture a chip-type capacitor.

Preparation Method 4 of Capacitor:

50 Units of a sintered body obtained in the same manner as in Preparation Method 2 of Sintered Body were prepared. Each sintered body was electrolytically oxidized at a voltage of 20 V for 6 hours using an aqueous 0.1% phosphoric acid solution to form an oxide dielectric film on the surface. Thereafter, the niobium sintered body was dipped in an aqueous solution containing 25 mass % of ammonium persulfate (Solution 1), pulled up and dried at 80° C. for 30 minutes. The sintered body having formed thereon a dielectric material was dipped in an isopropanol solution containing 18 mass % of 3,4-ethylenedioxythiophene (Solution 2), pulled up and then left standing in an atmosphere of 60° C. for 10 minutes to perform an oxidative polymerization. The sintered body was again dipped in Solution 1 and treated in the same manner as above. The operation from dipping in Solution 1 until oxidative polymerization was repeated 8 times. Thereafter, the sintered body was washed with warm water at 50° C. for 10 minutes and dried at 100° C. for 30 minutes to form a counter electrode composed of electrically conductive poly(3,4-ethylenedioxythiophene).

Subsequently, a carbon layer and a silver paste layer were sequentially stacked thereon. A lead frame was placed on the obtained laminate and the entire was sealed with epoxy resin to manufacture a chip-type capacitor.

Examples 1 to 40

Sintered bodies were manufactured in the same manner as in Preparation Method 1 or 2 of Sintered Body by changing the diniobium mononitride crystal content and the alloy component content as in Table 2. 50 Units of each sintered body were prepared and used for the production of capacitors by any one method of Preparation Methods 1 to 4 of Capacitor. Each capacitor (50 units) was evaluated on the heat resistance property and high-temperature property.

The results obtained are shown in Table 2.

Examples 41 to 60

Sintered bodies were manufactured in the same manner as in Preparation Method 3 of Sintered Body by using additives (an element as an alloy component or a compound thereof) of which kind and amount are shown in Table 3. 50 Units of each sintered body were prepared and used for the production of capacitors by any one method of Preparation Methods 1 to 4 of Capacitor. Each capacitor (50 units) was evaluated on the heat resistance property and high-temperature property. The results obtained are shown in Table 3.

Comparative Examples 1 to 8

For the purpose of comparison with Examples 1 to 60, niobium sintered bodies containing neither diniobium mononitride crystal nor other alloy components were manufactured in the same manner as in Preparation Method 4 or 5 of Sintered Body. 50 Units of each sintered body were prepared and used for the production of capacitors by any one method of Preparation Methods 1 to 4 of Capacitor. Each capacitor (50 units) was evaluated on the heat resistance property and high-temperature property. The results obtained are shown in Tables 2 and 3.

TABLE 2

| Examples, Comparative Examples | Preparation Method | Sintered Body Composition Component | Composition ratio by mass | Average Particle Size Powder μm | Average Particle Size Granulated Product μm | Capacitor Preparation Method | Capacitance μF | Leakage Current μA | High-Temperature Property, units | Heat Resistance Property, units |
|---|---|---|---|---|---|---|---|---|---|---|
| Example 1 | 1 | Nb:Zr:$Nb_2N$ | 49.5:0.5:50 | 1.0 | 110 | 1 | 488 | 15 | 0/50 | 0/50 |
| Example 2 | 1 | Nb:Zr:$Nb_2N$ | 49.5:0.5:65 | 1.0 | 128 | 1 | 460 | 18 | 0/50 | 0/50 |
| Example 3 | 1 | Nb:Zr:$Nb_2N$ | 49.5:0.5:25 | 1.0 | 111 | 2 | 477 | 12 | 0/50 | 0/50 |
| Example 4 | 1 | Nb:Zr:$Nb_2N$ | 49.5:0.5:10 | 1.0 | 129 | 2 | 480 | 18 | 0/50 | 0/50 |
| Example 5 | 2 | Nb:Zr:$Nb_2N$ | 44.1:0.9:55 | 0.9 | 99 | 3 | 490 | 16 | 0/50 | 0/50 |
| Example 6 | 2 | Nb:Zr:$Nb_2N$ | 44.8:0.2:54 | 0.9 | 81 | 3 | 504 | 17 | 0/50 | 0/50 |
| Example 7 | 2 | Nb:Zr:$Nb_2N$ | 42:3:58 | 0.9 | 75 | 4 | 488 | 16 | 0/50 | 0/50 |
| Example 8 | 2 | Nb:Zr:$Nb_2N$ | 73.3:1.7:26 | 0.9 | 149 | 4 | 491 | 15 | 0/50 | 0/50 |
| Example 9 | 2 | Nb:W:$Nb_2N$ | 59.6:0.4:41 | 0.5 | 120 | 4 | 921 | 107 | 0/50 | 0/50 |
| Example 10 | 2 | Nb:W:$Nb_2N$ | 59.6:0.4:39 | 0.7 | 180 | 4 | 610 | 71 | 0/50 | 0/50 |
| Example 11 | 2 | Nb:W:$Nb_2N$ | 59.6:0.4:37 | 1.0 | 91 | 4 | 466 | 19 | 0/50 | 0/50 |
| Example 12 | 2 | Nb:W:$Nb_2N$ | 59.6:0.4:44 | 1.3 | 62 | 4 | 340 | 9 | 0/50 | 0/50 |
| Example 13 | 2 | Nb:Y:$Nb_2N$ | 81:4:15 | 0.9 | 210 | 1 | 476 | 21 | 0/50 | 0/50 |
| Example 14 | 1 | Nb:La:$Nb_2N$ | 60.8:0.2:39 | 1.0 | 143 | 2 | 456 | 11 | 0/50 | 0/50 |
| Example 15 | 1 | Nb:Ce:$Nb_2N$ | 88.5:0.5:11 | 1.3 | 45 | 3 | 321 | 7 | 0/50 | 0/50 |
| Example 16 | 2 | Nb:Nd:$Nb_2N$ | 46.7:0.3:53 | 0.5 | 98 | 4 | 945 | 109 | 0/50 | 0/50 |
| Example 17 | 1 | Nb:Sm:$Nb_2N$ | 38.3:0.7:61 | 0.7 | 111 | 1 | 623 | 78 | 0/50 | 0/50 |
| Example 18 | 2 | Nb:Gd:$Nb_2N$ | 63.1:0.9:36 | 0.7 | 182 | 4 | 609 | 69 | 0/50 | 0/50 |
| Example 19 | 2 | Nb:Dy:$Nb_2N$ | 73.5:1.5:25 | 0.7 | 97 | 1 | 631 | 77 | 0/50 | 0/50 |
| Example 20 | 2 | Nb:Ho:$Nb_2N$ | 73.9:2.1:24 | 0.9 | 77 | 3 | 444 | 19 | 0/50 | 0/50 |
| Example 21 | 1 | Nb:Er:$Nb_2N$ | 76.3:1.7:22 | 0.9 | 33 | 3 | 491 | 19 | 0/50 | 0/50 |
| Example 22 | 2 | Nb:Yb:$Nb_2N$ | 52.9:3.1:44 | 0.9 | 88 | 4 | 481 | 17 | 0/50 | 0/50 |
| Example 23 | 1 | Nb:Ti:$Nb_2N$ | 33.9:0.1:66 | 0.9 | 109 | 1 | 473 | 22 | 0/50 | 0/50 |
| Example 24 | 1 | Nb:Hf:$Nb_2N$ | 61.5:0.5:38 | 0.9 | 99 | 2 | 468 | 21 | 0/50 | 0/50 |
| Example 25 | 1 | Nb:V:$Nb_2N$ | 87.5:0.5:12 | 1.3 | 105 | 3 | 331 | 9 | 0/50 | 0/50 |
| Example 26 | 2 | Nb:Ta:$Nb_2N$ | 40:10:50 | 1.3 | 133 | 4 | 342 | 9 | 0/50 | 0/50 |
| Example 27 | 2 | Nb:Mo:$Nb_2N$ | 94.9:0.1:5 | 0.9 | 232 | 1 | 489 | 18 | 0/50 | 0/50 |
| Example 28 | 1 | Nb:Mn:$Nb_2N$ | 49.9:0.1:50 | 0.9 | 78 | 2 | 465 | 22 | 0/50 | 0/50 |
| Example 29 | 2 | Nb:Ag:$Nb_2N$ | 49.9:0.1:50 | 0.9 | 88 | 1 | 491 | 25 | 0/50 | 0/50 |
| Example 30 | 2 | Nb:Zn:$Nb_2N$ | 54.9:0.1:45 | 0.9 | 97 | 4 | 477 | 21 | 0/50 | 0/50 |
| Example 31 | 2 | Nb:B:$Nb_2N$ | 37.7:0.3:62 | 0.7 | 110 | 4 | 641 | 65 | 0/50 | 0/50 |
| Example 32 | 2 | Nb:Al:$Nb_2N$ | 54.6:0.4:45 | 0.7 | 105 | 3 | 626 | 78 | 0/50 | 0/50 |
| Example 33 | 2 | Nb:Sb:$Nb_2N$ | 40.8:1.2:58 | 0.7 | 97 | 3 | 610 | 81 | 0/50 | 0/50 |
| Example 34 | 1 | Nb:Mg:$Nb_2N$ | 39.9:0.1:60 | 0.9 | 102 | 1 | 492 | 22 | 0/50 | 2/50 |
| Example 35 | 1 | Nb:Si:Ba:$Nb_2N$ | 47.4:1.5:0.1:51 | 0.9 | 106 | 2 | 478 | 17 | 0/50 | 0/50 |
| Example 36 | 2 | Nb:B:Nd:$Nb_2N$ | 89.3:0.3:0.4:10 | 0.7 | 95 | 4 | 621 | 59 | 0/50 | 0/50 |
| Example 37 | 2 | Nb:W:Yb:$Nb_2N$ | 59.4:0.4:1.2:39 | 0.7 | 121 | 4 | 662 | 67 | 0/50 | 0/50 |
| Example 38 | 1 | Nb:Mo:Mg:$Nb_2N$ | 94.8:0.1:0.1:5 | 0.9 | 45 | 2 | 483 | 19 | 0/50 | 0/50 |
| Example 39 | 1 | Nb:S:Ta:$Nb_2N$ | 51.7:0.3:5:43 | 1.3 | 170 | 3 | 321 | 9 | 0/50 | 0/50 |
| Example 40 | 2 | Nb:Y:B:Mg:$Nb_2N$ | 40:0.9:1.0:0.1:58 | 1.3 | 156 | 4 | 341 | 9 | 0/50 | 0/50 |
| Comparative Example 1 | 4 | Nb | 100 | 0.5 | 121 | 4 | 728 | 191 | 48/50 | 50/50 |
| Comparative Example 2 | 4 | Nb | 100 | 0.7 | 98 | 3 | 521 | 98 | 41/50 | 50/50 |
| Comparative Example 3 | 4 | Nb | 100 | 0.9 | 99 | 2 | 369 | 42 | 35/50 | 50/50 |
| Comparative Example 4 | 4 | Nb | 100 | 1.3 | 105 | 1 | 309 | 22 | 25/50 | 50/50 |

TABLE 3

| Example, Comparative Example | Preparation Method | Species of Additive | Composition Component | Composition ratio by mass | Sintered Body Average Particle Size Powder μm | Sintered Body Average Particle Size Granulated Product μm | Capacitor Preparation Method | Capacitor Capacitance μF | Capacitor Leakage Current μA | Capacitor High-Temperature Property, units | Capacitor Heat Resistance Property, units |
|---|---|---|---|---|---|---|---|---|---|---|---|
| Example 41 | 3 | zirconium hydride | Nb:Zr:Nb$_2$N | 73.2:1.8:25 | 0.9 | 150 | 1 | 479 | 17 | 0/50 | 0/50 |
| Example 42 | 3 | zirconium oxyacetate | Nb:Zr:Nb$_2$N | 32.7:3.3:64 | 1.0 | 182 | 2 | 467 | 17 | 0/50 | 0/50 |
| Example 43 | 3 | zirconium boride | Nb:Zr:B:Nb$_2$N | 53:1.8:0.2:45 | 1.0 | 101 | 1 | 477 | 18 | 0/50 | 0/50 |
| Example 44 | 3 | niobium boride | Nb:B:Nb$_2$N | 86.6:0.4:13 | 0.7 | 76 | 4 | 611 | 72 | 0/50 | 0/50 |
| Example 45 | 3 | boron oxide | Nb:B:Nb$_2$N | 44.8:0.2:55 | 0.7 | 87 | 3 | 606 | 69 | 0/50 | 0/50 |
| Example 46 | 3 | ammonium borate | Nb:B:Nb$_2$N | 50.2:0.8:49 | 0.8 | 132 | 3 | 572 | 66 | 0/50 | 0/50 |
| Example 47 | 3 | tungsten trioxide | Nb:W:Nb$_2$N | 33.2:1.8:65 | 0.9 | 104 | 4 | 468 | 16 | 0/50 | 0/50 |
| Example 48 | 3 | ammonium tungstate | Nb:W:Nb$_2$N | 65.6:0.4:34 | 0.7 | 204 | 4 | 621 | 77 | 0/50 | 0/50 |
| Example 49 | 3 | neodymium nitrate | Nb:Nd:Nb$_2$N | 56.8:1.2:42 | 0.5 | 120 | 4 | 944 | 110 | 0/50 | 0/50 |
| Example 50 | 3 | neodymium hydride | Nb:Nd:Nb$_2$N | 61.6:0.4:38 | 0.9 | 113 | 4 | 481 | 18 | 0/50 | 0/50 |
| Example 51 | 3 | ammonium molybdate | Nb:Mo:Nb$_2$N | 59.6:0.4:37 | 1.2 | 156 | 4 | 311 | 9 | 0/50 | 0/50 |
| Example 52 | 3 | gadolinium oxalate | Nb:Gd:Nb$_2$N | 52.2:0.8:47 | 1.0 | 109 | 1 | 465 | 16 | 0/50 | 0/50 |
| Example 53 | 3 | dysprosium carbonate | Nb:Dy:Nb$_2$N | 84:4:12 | 0.9 | 98 | 2 | 482 | 18 | 0/50 | 0/50 |
| Example 54 | 3 | holmium hydride | Nb:Ho:Nb$_2$N | 59.7:0.3:40 | 1.3 | 132 | 3 | 333 | 9 | 0/50 | 0/50 |
| Example 55 | 3 | ytterbium powder | Nb:Yb:Nb$_2$N | 66.5:0.5:33 | 1.3 | 104 | 4 | 341 | 10 | 0/50 | 0/50 |
| Example 56 | 3 | silicon oxide, ytterbium nitrate | Nb:Si:Yb:Nb$_2$N | 46.2:1.5:0.3:52 | 0.5 | 98 | 1 | 955 | 121 | 0/50 | 0/50 |
| Example 57 | 3 | neodymium fluoride, boron oxide | Nb:Nd:B:Nb$_2$N | 39.3:0.5:0.2:60 | 0.6 | 119 | 4 | 789 | 101 | 0/50 | 0/50 |
| Example 58 | 3 | samarium hydride, niobium boride | Nb:Sm:B:Nb$_2$N | 63.1:0.5:0.4:36 | 0.7 | 89 | 4 | 621 | 79 | 0/50 | 0/50 |
| Example 59 | 3 | yttrium hydride, tungsten trioxide | Nb:Y:W:Nb$_2$N | 74:0.5:0.5:25 | 0.9 | 107 | 1 | 454 | 17 | 0/50 | 0/50 |
| Example 60 | 3 | tantalum hydride, neodymium oxalate | Nb:Ta:Nd:Nb$_2$N | 72.5:5:0.5:22 | 0.9 | 98 | 3 | 449 | 17 | 0/50 | 0/50 |
| Comparative Example 5 | 5 | None | Nb | 100 | 0.5 | 101 | 4 | 701 | 221 | 50/50 | 50/50 |
| Comparative Example 6 | 5 | None | Nb | 100 | 0.7 | 75 | 3 | 502 | 111 | 45/50 | 50/50 |
| Comparative Example 7 | 5 | None | Nb | 100 | 0.9 | 176 | 2 | 331 | 63 | 38/50 | 50/50 |
| Comparative Example 8 | 5 | None | Nb | 100 | 1.3 | 144 | 1 | 287 | 27 | 29/50 | 50/50 |

INDUSTRIAL APPLICABILITY

A capacitor improved in the high-temperature property and heat resistance can be obtained by preparing a sintered body using a niobium alloy powder comprising as the alloy component at least one element selected from the group consisting of the elements belonging to Groups 2 to 16 of the periodic table and further comprising a diniobium mononitride ($Nb_2N$) crystal, and producing a capacitor using the sintered body.

The invention claimed is:

1. A niobium composition powder for capacitors comprising at least one element selected from the group consisting of Ag, Al, B, Ba, Ce, Dy, Er, Gd, Ho, La, Mg, Mn, Nd, Sb, Sm, S, Y, Yb and Zn,
    wherein the niobium composition powder has an average particle size of 5 µm or less and a BET specific surface area of 1 to 20 $m^2$/g.

2. A niobium granulated product for capacitors obtained by granulating the niobium composition powder claimed in claim 1.

3. A sintered body obtained by sintering the niobium composition powder claimed in claim 1.

4. A niobium composition powder for capacitors as claimed in claim 1, wherein the niobium composition powder has an average particle size of 0.05 to 4 µm.

5. A niobium composition powder for capacitors as claimed in claim 4, wherein the niobium composition powder has an average particle size of 0.05 to 1.3 µm.

* * * * *